(12) United States Patent
Robinson

(10) Patent No.: US 11,912,239 B2
(45) Date of Patent: Feb. 27, 2024

(54) COLLAPSIBLE AND TRANSPORTABLE RACK ASSEMBLY

(71) Applicant: Kyle Robinson, Menlo Park, CA (US)

(72) Inventor: Kyle Robinson, Menlo Park, CA (US)

( * ) Notice: Subject to any disclaimer, the term of this patent is extended or adjusted under 35 U.S.C. 154(b) by 0 days.

(21) Appl. No.: 17/706,685

(22) Filed: Mar. 29, 2022

(65) Prior Publication Data
US 2023/0226982 A1    Jul. 20, 2023

(51) Int. Cl.
*A47F 7/00* (2006.01)
*B60R 7/08* (2006.01)
*B65G 1/02* (2006.01)

(52) U.S. Cl.
CPC .............. *B60R 7/08* (2013.01); *A47F 7/0042* (2013.01); *B65G 1/02* (2013.01); *B65G 2201/022* (2013.01)

(58) Field of Classification Search
CPC ........ B60R 7/08; A47F 7/0042; A47F 5/0037; B65D 85/48; B65D 85/46; A47B 61/02; B65G 1/02; B65G 2201/022
USPC ...... 211/41.15, 41.14, 41.16, 41.6, 169, 150, 211/96, 41.5; 206/454, 448, 325
See application file for complete search history.

(56) References Cited

U.S. PATENT DOCUMENTS

| | | | | |
|---|---|---|---|---|
| 1,712,342 A * | 5/1929 | Fitzgerald | ................ | A47L 19/04 211/198 |
| 2,562,982 A * | 8/1951 | Cieri | ....................... | A47L 19/04 211/41.6 |
| 2,839,198 A * | 6/1958 | Lefevre | ................ | B65G 49/062 206/451 |
| 2,863,566 A * | 12/1958 | White | ...................... | B65G 1/02 211/41.14 |
| 2,946,453 A * | 7/1960 | Pityo | .................... | B65G 49/062 211/41.14 |
| 2,953,253 A * | 9/1960 | Henderson | ............. | B65D 85/48 206/448 |
| 2,958,424 A * | 11/1960 | Bigatti | .................... | A47L 19/00 211/104 |
| 4,046,261 A * | 9/1977 | Yake | ..................... | A47L 15/505 211/184 |
| 4,086,263 A * | 4/1978 | Rowley | .................. | B65D 85/48 410/35 |

(Continued)

FOREIGN PATENT DOCUMENTS

CN       212346322 U  *  1/2021
CN       212346322 U     1/2021

*Primary Examiner* — Jennifer E. Novosad

(57) ABSTRACT

A collapsible rack assembly for transport and storage of flat object(s) has been disclosed. The collapsible rack assembly includes a base subassembly, a rotational shaft subassembly, and a rack subassembly. The base subassembly includes an L track system connected to spacers to define the overall shape of the base subassembly. The rotational shaft subassembly includes multiple side rotational shafts, an intermediate rotational shaft, multiple clamps, and a lever clamp. The rack assembly further includes side racks and an intermediate rack. Each of the side racks is fixedly connected to the side rotational shaft. The intermediate rack is fixedly connected to the intermediate rotational shaft. Each of the side racks and intermediate rack includes elongated rods spaced from one another to receive the flat object(s) such as door panels between two consecutive elongated rods.

19 Claims, 9 Drawing Sheets

(56) References Cited

U.S. PATENT DOCUMENTS

| | | | | |
|---|---|---|---|---|
| 4,169,638 A * | 10/1979 | Cirasuolo | A47L 19/04 | 211/41.6 |
| 4,778,064 A * | 10/1988 | Gold | B65G 49/062 | 206/456 |
| 5,505,574 A * | 4/1996 | Piazza | B65G 1/10 | 211/162 |
| 5,520,316 A * | 5/1996 | Chen | B60R 7/02 | 224/567 |
| 5,582,495 A * | 12/1996 | Schroeder | B60P 7/10 | 410/43 |
| 5,641,076 A * | 6/1997 | Englund | B65G 49/062 | 206/454 |
| 5,884,778 A * | 3/1999 | Freiheit | A47F 7/0042 | 211/195 |
| 6,247,601 B1 * | 6/2001 | Norton | B65D 85/48 | 211/41.14 |
| 6,394,286 B1 * | 5/2002 | Dueck | A47F 7/166 | 211/48 |
| 6,477,732 B1 * | 11/2002 | Cline | A46B 7/023 | 132/121 |
| 6,783,010 B1 * | 8/2004 | Berger | B65G 49/062 | 211/41.14 |
| 7,264,126 B1 * | 9/2007 | Bergeron | B65G 49/062 | 211/41.15 |
| 7,293,946 B1 * | 11/2007 | Fuller | B60P 7/13 | 410/43 |
| 7,458,470 B2 * | 12/2008 | Jerstroem | A47L 19/04 | 211/41.6 |
| 7,682,465 B2 * | 3/2010 | Anderson | A47L 15/0084 | 211/41.9 |
| 7,748,802 B2 * | 7/2010 | Peruzzi | A47B 46/005 | 312/351 |
| 7,926,667 B2 * | 4/2011 | Ding | B08B 13/00 | 211/26.2 |
| 7,931,155 B2 * | 4/2011 | Bastuji | A47L 15/503 | 211/41.9 |
| 7,934,608 B2 * | 5/2011 | Ydstrom | A47B 47/00 | 211/195 |
| 8,875,909 B2 * | 11/2014 | Gerkensmeier | B65D 25/06 | 211/175 |
| 11,612,300 B2 * | 3/2023 | Harr | A47L 15/505 | 211/41.8 |
| 11,642,002 B1 * | 5/2023 | Tanpure | A47L 15/503 | 211/41.8 |
| 11,717,135 B1 * | 8/2023 | Wood | A47L 19/00 | 211/41.6 |
| 2003/0164318 A1 * | 9/2003 | Lacasse | B65D 85/48 | 206/448 |
| 2023/0226982 A1 * | 7/2023 | Robinson | B65G 1/02 | 211/85.8 |

* cited by examiner

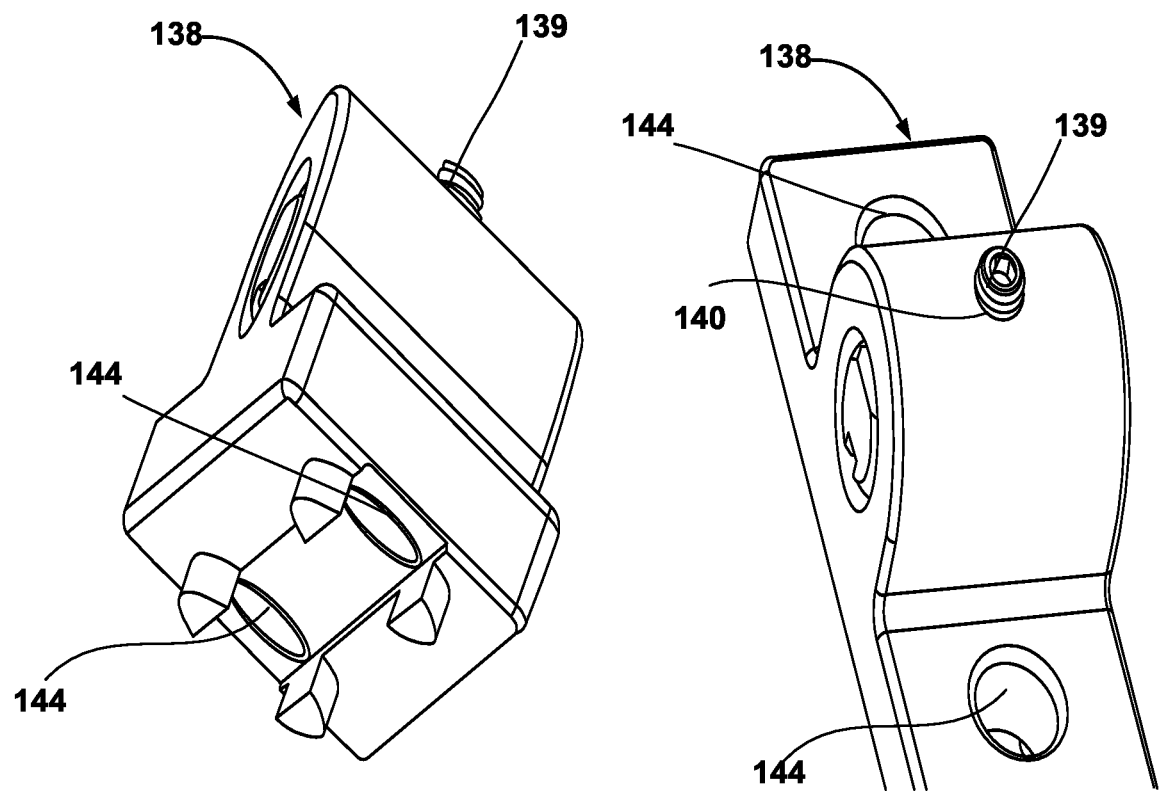
FIG. 6  FIG. 7

COLLAPSIBLE AND TRANSPORTABLE RACK ASSEMBLY

TECHNICAL FIELD

The present invention generally relates to a device and method for carrying articles and more particularly, the present invention relates to a device and method for transportation and storage of substantially flat objects such as door panels.

BACKGROUND

Racks for storing flat or semi-flat objects are well known in the art. These racks are known from a variety of technical fields. These racks store a variety of flat or semi-flat objects including but not limited to door panels, pictures, tiles, wooden panels, and so on. Generally, these racks have limited mobility and a fixed shape and thus, occupy a large space which limits their use to fixed locations and large spaces.

Generally, door panels are often produced or finished in a factory or a workshop and are later transported for use where these door panels are connected to the door frame or cabinet box. Different modes of transporting such door panels are often employed so that the door panels arrive at the desired location with minimal damage to the door panel material and finish. Often, these panels are placed on non-clamping shelves of a fixed rack and later transported using vehicles. These racks have a fixed shape (geometry) such that even when the rack is not holding any door panel (i.e., not in use), it occupies a considerable space in the vehicle. Additionally, because there is no clamping feature to currently fixed racks, the panels and panel finishes are still at risk of damage during transport. Alternatively, another common mode of transport is to wrap panels individually in a protective layer of packing material and placed into a vehicle for transport. The vehicles commonly used for transport have limited space and both methods of transporting panels, installing fixed shape racks for carrying and transporting door panels and placing a large number of individually wrapped panels, further reduce the usable space of vehicles. Thus, neither current common practice is ideally suited for use in lesser space vehicles and systems. Further, wrapping up of the panels individually result is outgassing issues because the gases from the finished panels remain trapped within the wrap.

Various types of collapsible storage racks have been used in the prior art to address the issue of space management of racks when not in use. These collapsible storage racks are known from a variety of technical fields. For instance, U.S. Pat. No. 7,934,608b2 discloses a collapsible rack for transport and storage, includes a first and a second panel, and a plurality of distance bars. The first and second panels include a groove side including at least one groove. A first and a second edge is arranged on opposite sides and adjacent to these, a third and a fourth edge. The third and fourth edges each include at least one hole that extends parallel to the first and second edges. The hole has a non-circular shape. The distance bars at each of their ends include a hole coupling mechanism. The hole coupling mechanism extends perpendicular to the extension of the bar. The hole coupling mechanisms include clutching sections that match the hole, wherein pivoting between the bars and the first and second panel is prevented where the hole coupling mechanism and hole are fully mated.

CN212346322U discloses a foldable dish storage rack and belongs to the technical field of storage. The foldable dish storage rack comprises two side frames, a layer plate connected between the two side frames and a dish storage assembly arranged on the layer plate, the two sides of the layer plate are connected with the side frames on the corresponding sides through side frame turnover mechanisms used for folding and unfolding the side frames respectively, and each side frame turnover mechanism comprises a connecting piece and a rotary vertical clamp.

The existing prior art does not provide a solution that efficiently and effectively transports and stores flat objects such as door panels as well as occupies less space when it is not in use.

In the light of the foregoing, there is a need for a collapsible rack assembly that efficiently, effectively and securely transports and stores flat objects such as door panels as well as occupies less space when it is not in use.

SUMMARY

It is an objective of the present invention to provide a collapsible and transportable rack assembly that is configured to securely hold a plurality of substantially flat objects.

It is an objective of the present invention to provide a collapsible and transportable rack assembly that could be easily installed or used in a vehicle.

It is an objective of the present invention to provide a collapsible and transportable rack assembly that occupies minimal space when the collapsible rack is not in use.

Another object of the present invention is to provide a collapsible and transportable rack assembly that can be moved from one location to another location.

Yet another objective of the present invention is to provide a collapsible and transportable rack assembly in which a plurality of substantially flat objects (Eg. door panels) are transported more conveniently with a lesser risk of trapping the outgases from the finished panels. This is because the current invention does not require individual wrapping of the panels.

Embodiments of the present invention disclose a collapsible rack assembly for the secure transport and storage of at least one substantially flat object comprising:—a rotational shaft subassembly comprising a plurality of side rotational shafts, an intermediate rotational shaft(s), a plurality of clamp(s) and at least one lever clamp; wherein at least one clamp permits rotation of a side rotational shaft relative to clamp. The lever clamp(s) allows sliding motion as well as rotational motion of the intermediate rotational shaft(s) relative to the lever clamp(s). A rack subassembly comprising a plurality of side racks; wherein each side rack is fixedly connected to a side rotational shaft. The rack subassembly further comprises an intermediate rack(s) fixedly connected to an intermediate rotational shaft(s); wherein each side rack as well as the intermediate rack(s) comprises a plurality of elongate rods spaced from one another to receive at least one substantially flat object between two consecutive elongate rods.

In an embodiment, the substantially flat object comprises a door panel.

In an embodiment, the collapsible rack assembly comprises a base subassembly which includes a plurality of L track systems connected to at least one spacer to define the overall shape of the base subassembly.

In an embodiment, the plurality of clamp(s) as well as lever clamp(s) comprise a plurality of fastener slots to removably connect the plurality of clamp(s) as well as lever clamp(s) to the plurality of L track systems.

In an embodiment, at least one clamp comprises a manually operable rotational lock that selectively enables or disables rotation of side rotational shaft relative to clamp.

In an embodiment, each lever clamp(s) comprises a manually operable lever that selectively enables or disables sliding motion as well as rotational motion of intermediate rotational shaft(s) relative to the lever clamp(s).

In an embodiment, the intermediate rotational shaft(s) comprises an elongate slot to allow sliding motion of intermediate rotational shaft(s) relative to the lever clamp(s) by operating the manually operable lever.

In an embodiment, the plurality of elongate rods comprises at least one contact element positioned on each elongate rod.

In an embodiment, each side rack comprises a side support platform to provide a resting surface for at least one substantially flat object between any two consecutive elongate rods of side rack.

In an embodiment, the intermediate rack(s) comprises a central support platform to provide a resting surface for at least one substantially flat object positioned between any two consecutive elongate rods of intermediate rack(s).

In an embodiment, the plurality of elongate rods could be selectively positioned in a deployed position and a collapsed position; wherein in the deployed position, the plurality of elongate rods are configured to receive at least one substantially flat object between two consecutive elongate rods; wherein in the collapsed position, the plurality of elongate rods occupies minimal space and does not receive any substantially flat object between two consecutive elongate rods.

In an embodiment, the plurality of elongate rods could be brought from a deployed position to a collapsed position by rotating the plurality of elongate rods by 90 degrees in a specific direction and vice versa.

In an embodiment, the collapsible rack assembly could be removably installed in a vehicle.

The present invention provides a collapsible rack assembly for the transport and storage of at least one substantially flat object. These and other features and advantages of the present invention will become apparent from the detailed description below, in light of the accompanying drawings.

BRIEF DESCRIPTION OF THE DRAWINGS

FIGS. 6-7 shows various perspective views of the clamp of the collapsible rack assembly of FIG. 1;

DETAILED DESCRIPTION

Before describing the present invention in detail, it should be observed that the present invention utilizes a combination of components or processes, which constitutes a collapsible, transportable rack and clamping assembly. Accordingly, the components or processes have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific component-level details and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

References to "one embodiment", "an embodiment", "another embodiment", "one example", "an example", "another example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment. The words "comprising", "having", "containing", and "including", and other forms thereof, are intended to be equivalent in meaning and be open-ended in that an item or items following any one of these words is not meant to be an exhaustive listing of such item or items or meant to be limited to only the listed item or items.

The collapsible and transportable rack assembly 100 will now be described with reference to the accompanying drawings, particularly FIGS. 1-10.

Figure 1:
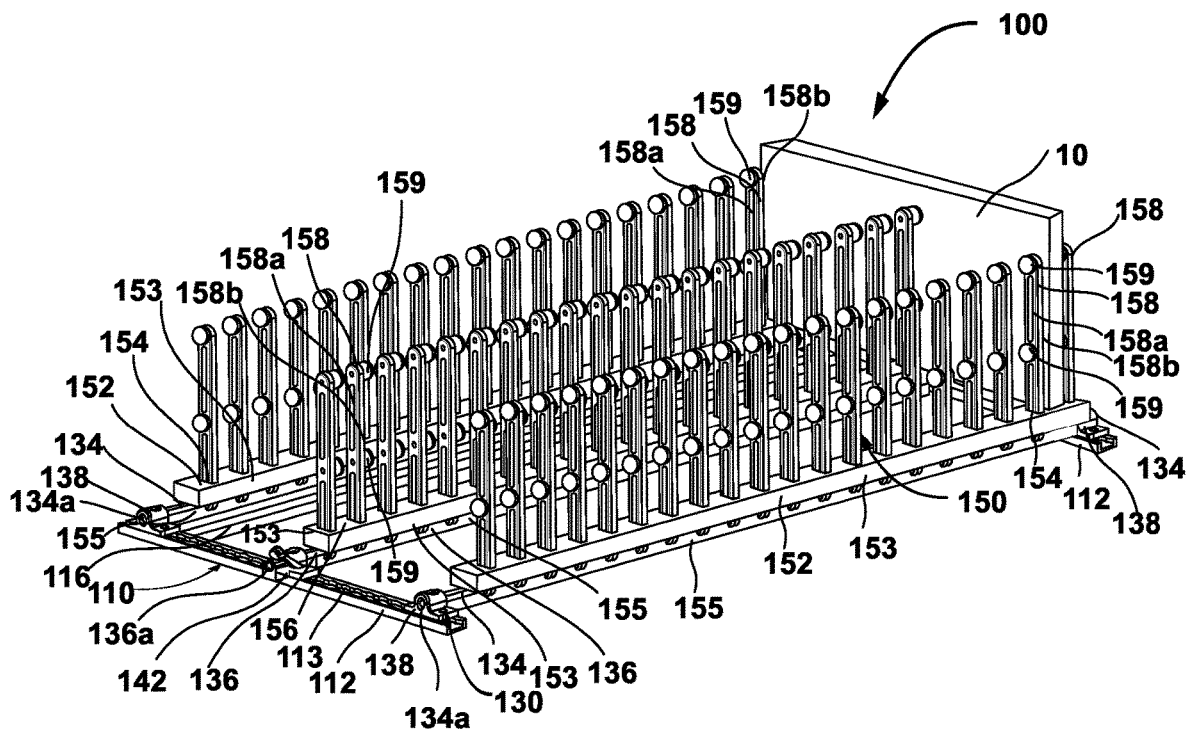
FIG. 1 shows a first perspective view of the collapsible rack assembly in a deployed position, according to an embodiment of the invention.
Figure 2:
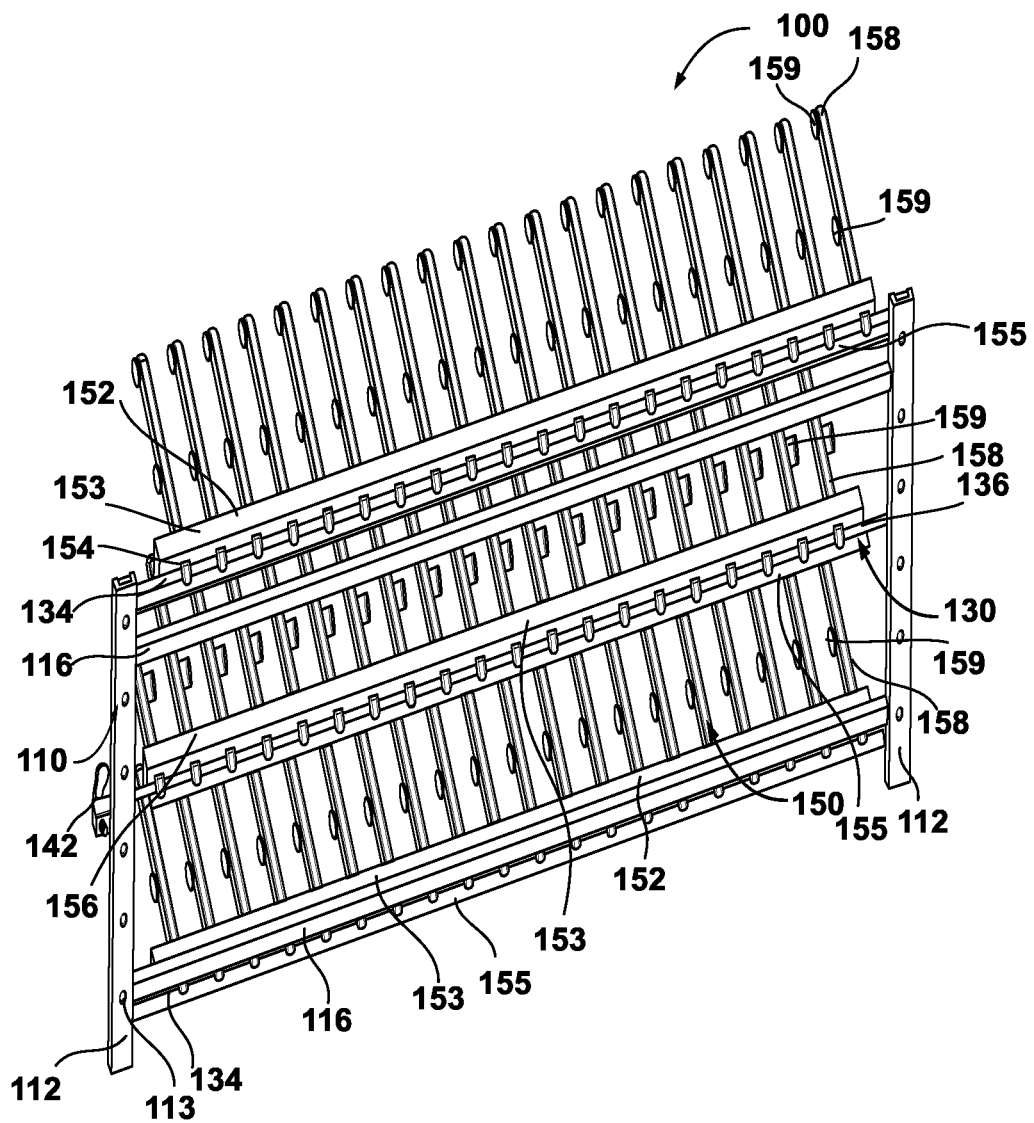
FIG. 2 shows a second perspective view of the collapsible rack assembly of FIG. 1.

FIG. 1 and FIG. 2 show a first perspective view and a second perspective view of the collapsible rack assembly 100 in a deployed position, according to an embodiment of the invention. The rack assembly 100 is configured for storing and transporting at least one substantially flat object 10 (FIG. 1) such as but not limited to door panels and so on in a substantially vertical position. The rack assembly 100 comprises a base subassembly 110, a rotational shaft subassembly 130, and a rack subassembly 150 which will be described in greater detail in the below description.

Figure 10:
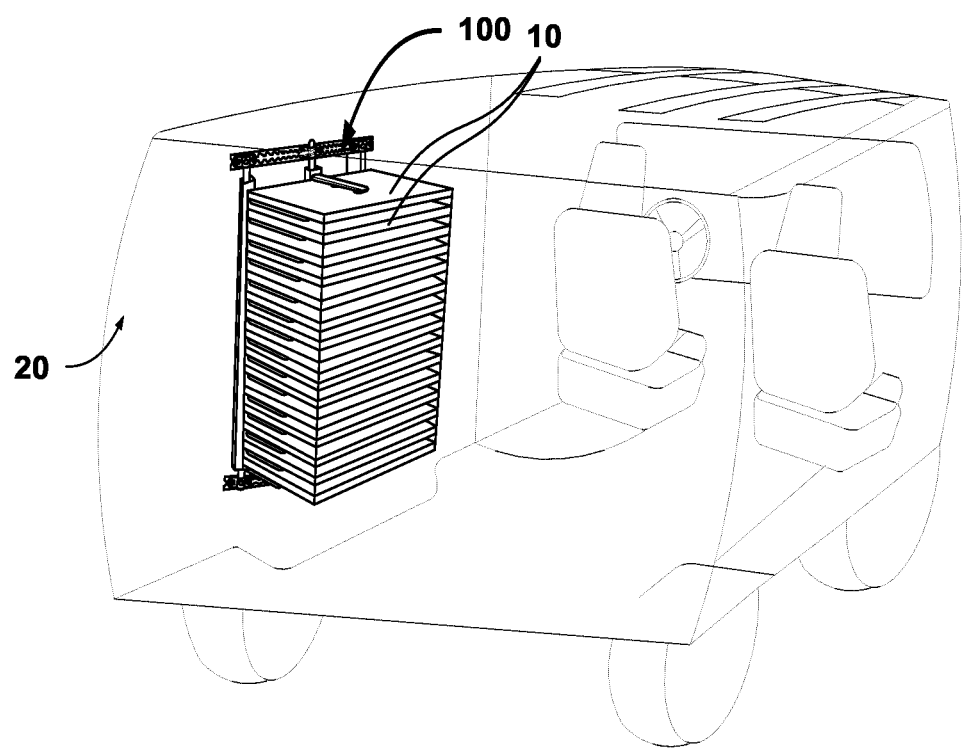
FIG. 10 shows the collapsible rack assembly of FIG. 1 attached to a vehicle.

Referring to FIGS. 1-5, the base subassembly 110 is configured to removably connect the rack assembly 100 to a working surface 20 (FIG. 10). The base subassembly 110 further allows removable mounting of a plurality of clamps 138 and at least one lever clamp(s) 142 of the rotational shaft subassembly 130 which will be described in greater detail in the below description. The base subassembly 110 comprises a plurality of L track systems 112 connected to a plurality of spacers 116 to define the overall shape of the base subassembly 110. Each L track system 112 comprises at least one attachment means 113 to connect each L track system 112 to the working surface 20 (FIG. 10) such as but not limited to car interior, car roof, factory floor, and so on. Further, the attachment means 113 allows removable mounting of a plurality of clamps 138 and at least one lever clamp(s) 142 to the plurality of L track systems 112. In an embodiment as shown in FIG. 1, the attachment means 113 comprises a plurality of screw holes to removably connect each L track system 112 to the working surface 20 (FIG. 10). In another embodiment, the attachment means 113 could include connection means such as but not limited to welding joint, rivets, magnetic coupling, screw, and pin coupling, snap-fit coupling, friction fit coupling, and so on to connect the L track system 112 to the working surface 20 (FIG. 10).

In another embodiment (not shown in figures), the base subassembly 110 comprises at least one tie-down system capable of connecting the rack assembly 100 to the working surface 20 (FIG. 10). The tie-down system further allows removable mounting of the plurality of clamps 138 and at least one lever clamp(s) 142 of the rotational shaft subassembly 130. The tie-down system(s) could include but are not limited to E track systems, tie-down rails, tie-down straps, chains and belts, ropes, bolts, pins, and so on.

As shown in FIG. 1, the rotational shaft subassembly 130 is operably connected to the base subassembly 110. The rotational shaft subassembly 130 comprises a plurality of side rotational shafts 134, an intermediate rotational shaft(s) 136, a plurality of clamps 138, and at least one lever clamp(s) 142. Each of the side rotational shafts 134 comprises a first end 134a and an opposite second end 134b. A clamp 138 is positioned on the first end 134a of each of the plurality of side rotational shafts 134 and another clamp 138 is positioned on the opposite second end 134b of each of the plurality of side rotational shafts 134. The first end 134a and an opposite second end 134b of each of the plurality of side rotational shafts 134 are configured such that the side rotational shafts 134 do not slide relative to the clamps 138.

Figure 3:
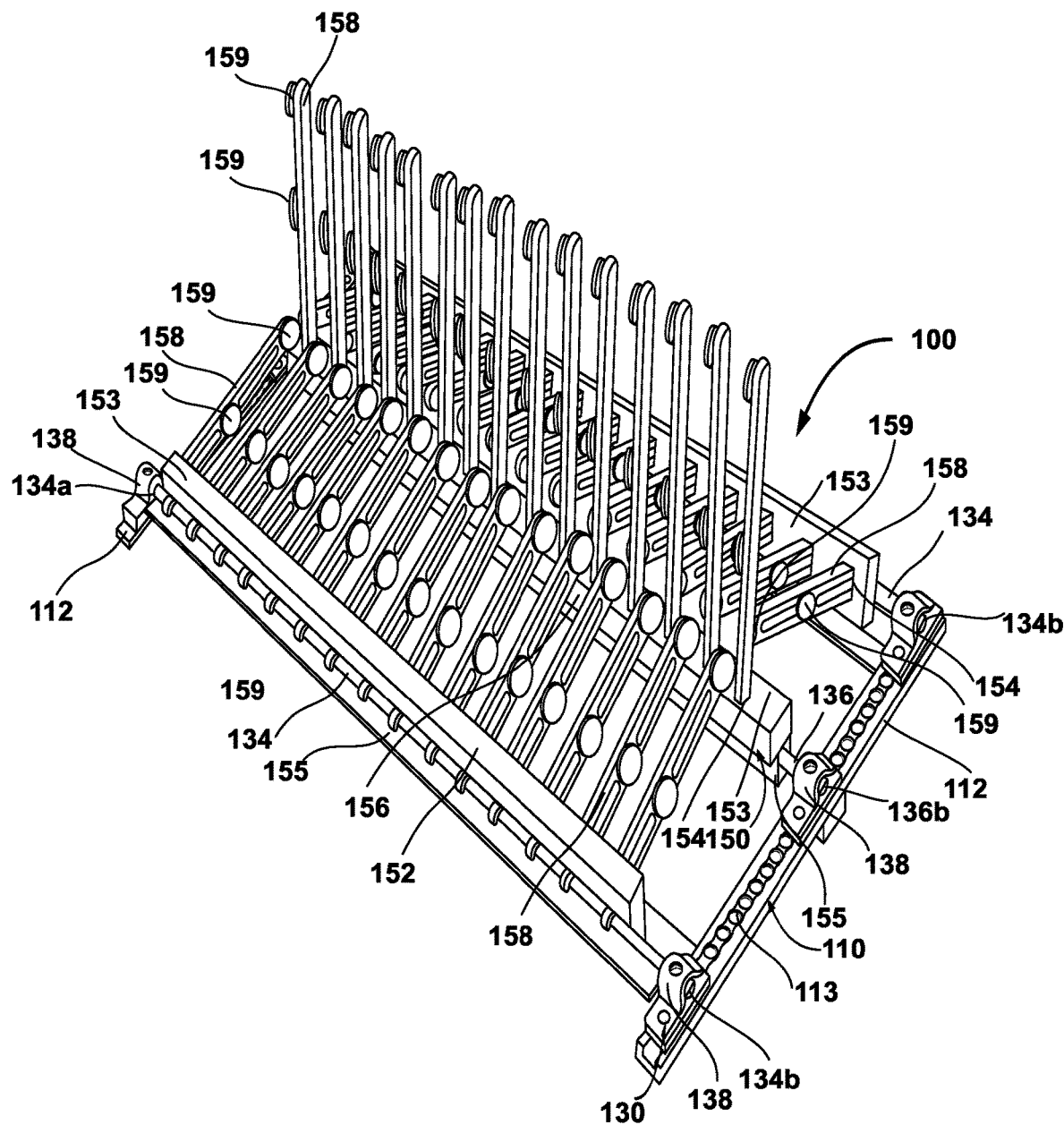
FIG. 3 shows the collapsible rack assembly of FIG. 1 in an intermediate position between the deployed position and collapsed position.

The intermediate rotational shaft(s) 136 comprises a first end 136a and an opposite second end 136b. A lever clamp 142 is positioned on a first end 136a of the intermediate rotational shaft(s) 136 and a clamp 138 is positioned on the opposite second end 136b of the intermediate rotational shaft(s) 136 as seen in FIG. 1-3.

Each of the plurality of clamps 138 allows rotational motion of the side rotational shaft 134 of the rotational shaft subassembly 130 relative to the clamp 138. The lever clamp 142 is positioned between the intermediate rotational shaft(s) 136 and the L track system 112 of the base subassembly 110. The lever clamp 142 allows sliding motion as well as rotational motion of the intermediate rotational shaft(s) 136 relative to the lever clamp 142.

Each of the plurality of clamps 138 as well as the lever clamp(s) 142 comprise a plurality of fastener slots 144. A fastener (not shown) passes through the fastener slot 144 and fits inside the attachment means 113 of the L track systems 112. Thereby, the plurality of fasteners (not shown) removably connects the plurality of clamps 138 as well as the lever clamp(s) 142 to the plurality of L track systems 112.

Referring to FIGS. 6 and 7, at least one clamp 138 comprises a manually operable rotational lock 139 that selectively enables or disables rotation of side rotational shaft 134 relative to the clamp 138. As seen in FIGS. 1-4, the clamp 138 is positioned on the first end 134a of each of the plurality of side rotational shafts 134 and another clamp 138 is positioned on the opposite second end 134b of each of the plurality of side rotational shafts 134. As shown in FIGS. 6 and 7, the manually operable rotational lock 139 is a screw-type fastener 139 that is positioned in a hole 140 of the clamp 138. The screw type fastener 139 have two operating positions i.e., locked position and unlocked position. In the locked position, the screw type fastener 139 engages against the side rotational shaft 134 to rotationally lock the side rotational shaft 134 relative to the clamp 138. In the unlocked position, the screw type fastener 139 does not engage (axially displaced) against the side rotational shaft 134, thereby allowing the side rotational shaft 134 to rotate relative to the clamp 138.

In an embodiment, the side rotational shaft 134 could include a surface feature such that when the screw type fastener 139 is in the locked position, the screw type fastener 139 engages (abuts) against the surface feature of the side rotational shaft 134 to rotationally lock the side rotational shaft 134 relative to the clamp 138. As shown in FIG. 1, the surface feature is a flat surface such that when the screw type fastener 139 engages (abuts) against the flat surface of the side rotational shaft 134, then the side rotational shaft 134 is rotationally locked relative to the clamp 138. In another embodiment (not shown in figures), the surface feature could include but is not limited to the blind hole, through hole, flat surface, friction lining, and so on.

In an embodiment, when the screw type fastener 139 is rotated in a specific direction, it disengages the screw type fastener 139 from the side rotational shaft 134, thereby bringing the screw type fastener 139 in the unlocked position. Similarly, when the screw type fastener 139 is rotated in an opposite direction, it engages the screw type fastener 139 against the side rotational shaft 134, thereby bringing the screw type fastener 139 in the locked position.

In another embodiment, the screw type fastener 139 can be brought from the unlocked position to the locked position by sliding the screw type fastener 139 positioned in the hole 140 towards the side rotational shaft 134 and vice versa.

Figure 8:
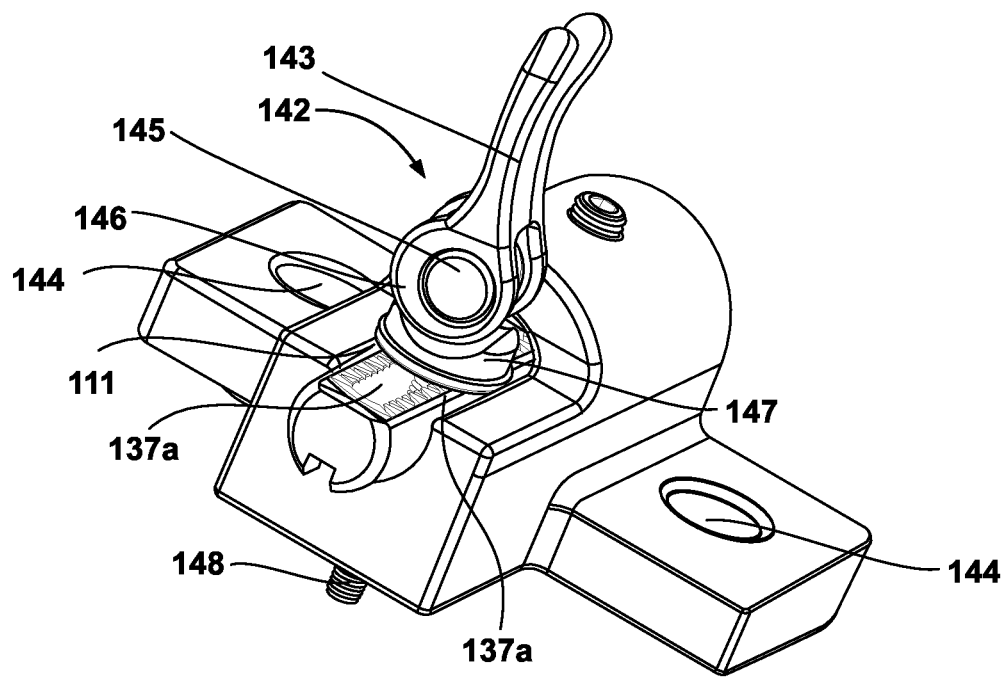
FIG. 8 shows a lever clamp of the collapsible rack assembly of FIG. 1 in a locked position.
Figure 9:
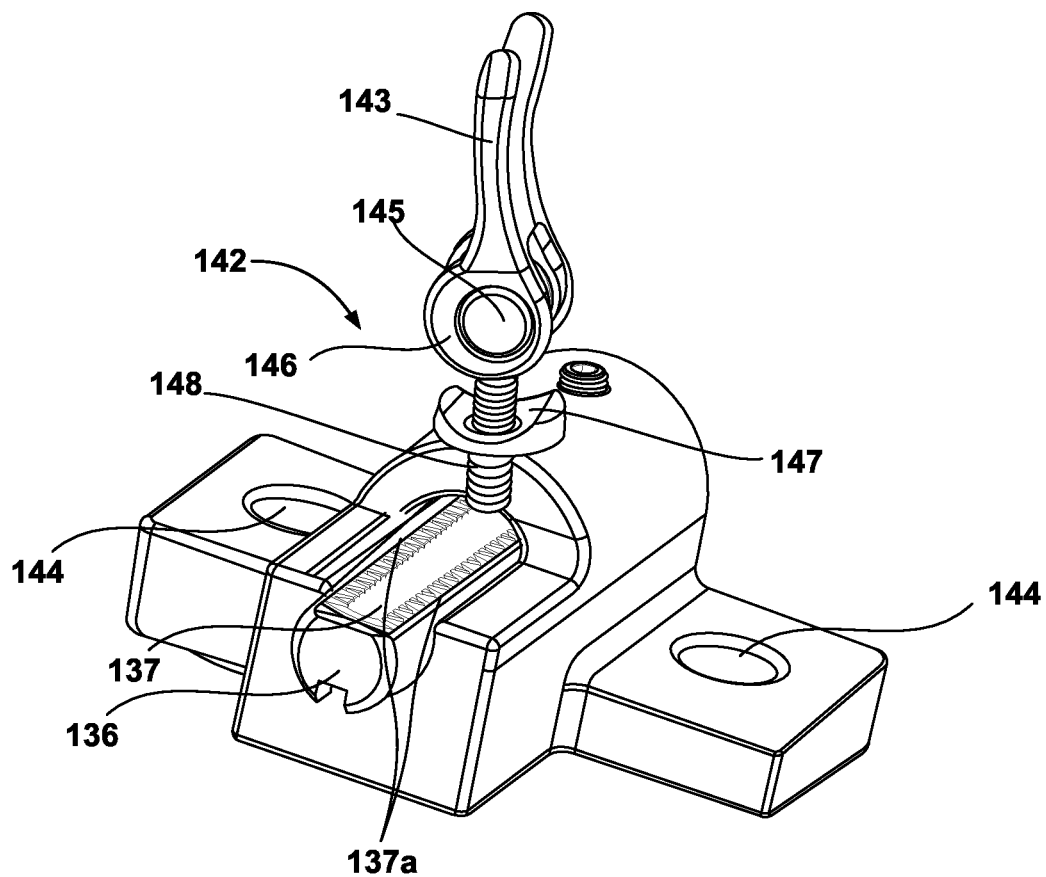
FIG. 9 shows a lever clamp of the FIG. 8 in an unlocked position.

Referring to FIGS. 8-9, the lever clamp(s) 142 comprises a manually operable lever 143 that selectively enables or disables sliding motion as well as rotational motion of intermediate rotational shaft(s) 136 relative to the lever clamp(s) 142. The manually operable lever 143 comprises a cam element 145, a bearing element 146, a pad element 147, and a fastener element 148. The lever clamp(s) 142 further comprises a hole 149 (not shown in figures) that receives the fastener element 148. As shown in FIGS. 8-9. The intermediate rotational shaft(s) 136 comprises an elongate slot 137 to allow sliding motion of intermediate rotational shaft(s) 136 relative to the lever clamp(s) 142. Further, the intermediate rotational shaft(s) 136 comprises a surface feature 137a such as but not limited to friction lining, ribbed pattern, and so on such that when the surface feature 137a of the intermediate rotational shaft(s) 136 is in contact with the pad element 147, the intermediate rotational shaft(s) 136 is rotationally and slidably locked relative to the lever clamp(s) 142.

The lever clamp(s) 142 has three operating positions:— (1) locked position as shown in FIG. 8; in which the intermediate rotational shaft(s) 136 is rotationally and slidably locked relative to the lever clamp(s) 142 (2) intermediate position; in which intermediate rotational shaft(s) 136 is rotationally locked relative to the lever clamp(s) 142 but the intermediate rotational shaft(s) 136 could slide relative to the lever clamp(s) 142, and the (3) unlocked position as shown in FIG. 9; in which the intermediate rotational shaft(s) 136 can rotationally and slidably move relative to the lever clamp(s) 142.

According to some other embodiment (not shown in the figures), the collapsible and transportable rack assembly 100 may be configured to embody a plurality of wheels in order to allow movement of the rack assembly 100 of FIG. 1 from one location to another. In an embodiment, the wheels may be configured underside of each L track system 112 of the base subassembly 110. In this configuration, the wheels will be disposed of opposing the clamps 138. In another example, the wheels may be configured underside of the spacers 116 of the base subassembly 110. In some other embodiments, the rack assembly 100 of FIG. 1 may be removably mounted on a wheeled carriage for moving the rack assembly or rack assembly with the door panels from one location to another. The wheeled carriage may be any conventionally available wheeled carriage or a custom designed wheeled carriage based on the dimensions of the rack assembly 100.

An exemplary method of operating the lever clamp(s) 142 is described in detail below.

Initially, the lever clamp(s) 142 is in an intermediate position such that the intermediate rotational shaft(s) 136 is rotationally locked relative to the lever clamp(s) 142 but the intermediate rotational shaft(s) 136 could slide relative to the lever clamp(s) 142. In the intermediate position, the fastener element 148 is received in a hole 149 (not shown in figures). When the manually operable lever 143 is rotated in a specific direction (clockwise direction) relative to the bearing element 146, the cam element 146 is rotated. Thus, the cam element 146 pushes the pad element 147 towards the surface feature 137a of the intermediate rotational shaft(s) 136, thus rotationally and slidably locking the intermediate rotational shaft(s) 136 relative to the lever clamp(s) 142 and bringing the manually operable lever 143 in the locked position as shown in FIG. 8.

By merely reversing the above steps with little or no variation, the manually operable lever 143 can be brought from the locked position (FIG. 8) to the intermediate position.

In the intermediate position, the intermediate rotational shaft(s) 136 is rotationally locked relative to the lever clamp(s) 142 due to fastener element 148 positioned in the hole 149 (not shown in figures) but the intermediate rotational shaft(s) 136 could slide relative to the lever clamp(s) 142. To bring the lever clamp(s) 142 from the intermediate position to the unlocked position (FIG. 9), the fastener element 148 is removed from the hole 149 (not shown in figures) which further allow the intermediate rotational shaft(s) 136 to rotate relative to the lever clamp(s) 142.

Referring to FIGS. 1-4, the rack subassembly 150 will now be described in detail. The rack assembly comprises a plurality of side racks 152 and at least one intermediate rack 156. Each of the plurality of side racks 152 is fixedly connected to a side rotational shaft 134. The intermediate rack(s) 156 is fixedly connected to an intermediate rotational shaft(s) 136. Each of the plurality of side racks 152 as well as the intermediate rack(s) 156 comprises a plurality of elongated rods 158 spaced from one another to receive at least one substantially flat object 10 between two consecutive elongate rods 158. Each of the plurality of side racks 152 are identical in nature and comprises an equal number of elongated rods 158. Each elongated rod 158 of one side rack 152 lies in the same plane with the corresponding elongated rod 158 of the remaining side racks 152 such that the first elongated rod 158 of one side rack 152 lies in same plane with the first elongated rod 158 of the other side racks 152, second elongated rod 158 of one side rack 152 lies in the same plane with the second elongated rod 158 of the other remaining side racks 152 and so on. Each elongated rod 158 comprises a first surface 158a and a second surface 158b disposed opposite to the first surface 158a.

In an embodiment as shown in FIG. 1, a top contact element 159 and a middle contact element 159 are positioned on the first surface 158a of each elongated rod 158 of the side racks 152. Further, as seen in FIG. 1, the top contact element 159 and the middle contact element 159 are positioned on the second surface 158b of each elongated rod 158 of the intermediate rack(s) 156. This configuration enables minimum contact of the substantially flat object(s) 10 with the rack subassembly 150 such that the substantially flat object(s) 10 is in contact (sandwiched between) with the top contact elements 159 and the middle contact elements 159 of the elongate rods 158 of the side racks 152 as well as the top contact element 159 and the middle contact element 159 of the intermediate rack(s) 156 during storage and/or transport of the substantially flat object(s) 10.

In another embodiment (not shown in figures), a top contact element 159 and a middle contact element 159 are positioned on first surface 158a of each elongated rod 158 of the side racks 152 as well as intermediate rack(s) 156. The second surface 158b of the elongated rods 158 of the side racks 152 as well as intermediate rack(s) 156 is substantially flat in nature. Thus, the substantially flat object(s) 10 is in contact with (sandwiched between) the flat second surfaces 158b of the elongated rods 158 of the side racks 152, flat second surfaces 158b of the elongated rods 158 of the intermediate rack(s) 156, top contact elements 159 and the middle contact elements 159 of the elongated rods 158 of the side racks 152 as well as top contact elements 159 and the middle contact elements 159 of the elongated rods 158 of the intermediate rack(s) 156.

In an embodiment (not shown in figures), the top contact element 159 and middle contact element 159 of each elongated rod 158 of the intermediate rack(s) 156 are set to be slightly different in size and shape than the top contact element 159 and middle contact element 159 of each elongated rod 158 of the side racks 152, thereby allowing holding and storage of substantially flat object 10 having uneven thickness and/or design features.

Each side rack 152 comprises a side support platform 153 to provide a resting surface for at least one substantially flat object 10 between any two consecutive elongated rods 158 of the side rack 152. Each side support platform 153 comprises a plurality of through holes 154 for enabling passage of the plurality of elongated rods 158 of each side rack 152. Further, each side support platform 153 is connected to a reinforcing plate 155. The reinforcing plate 155 increases the structural rigidity of the side rack 152 as well as supports the weight loads exerted by the flat object 10 and the side rack 152.

Further, the intermediate rack(s) 156 comprises a central support platform 153 to provide a resting surface for at least one substantially flat object 10 positioned between any two consecutive elongated rods 158 of intermediate rack(s) 156. Each central support platform 153 comprises a plurality of through holes 154 for enabling passage a plurality of elongated rods 158 of each intermediate rack(s) 156. Further, each central support platform 153 is connected to a reinforcing plate 155. The reinforcing plate 155 increases structural rigidity of the intermediate rack(s) 156 as well as supports the weight loads exerted by the flat object 10 and the intermediate rack(s) 156.

Figure 4:
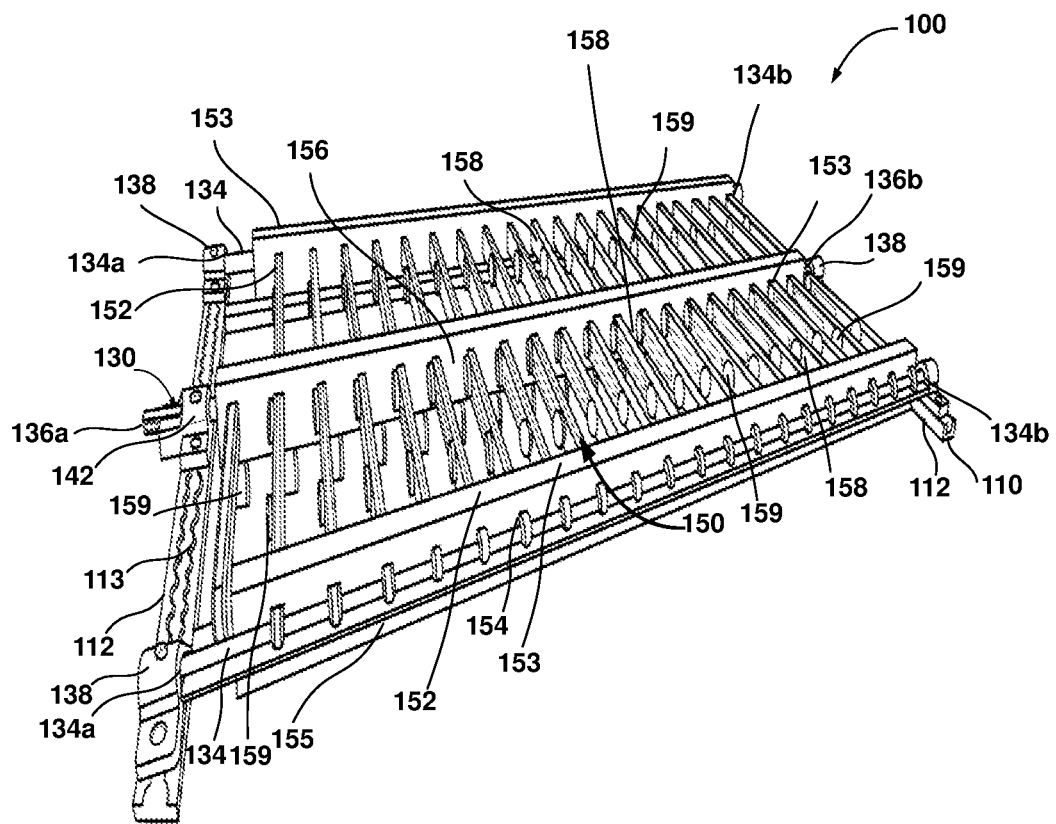
FIG. 4 shows a perspective view of the collapsible rack assembly of FIG. 1 in a collapsed position.
Figure 5:
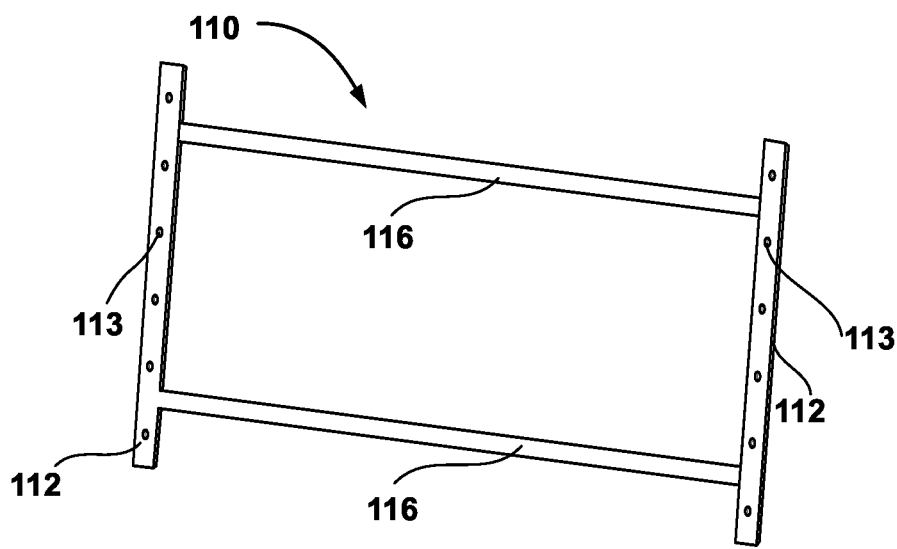
FIG. 5 is a top view of a base assembly of the collapsible rack assembly of FIG. 1.

The plurality of elongated rods 158 could be selectively positioned in a deployed position (FIG. 1) and a collapsed position (FIG. 4). In the deployed position as seen in FIGS. 1-2, the plurality of elongated rods 158 are configured to receive at least one substantially flat object 10 between two consecutive elongate rods 158. In the collapsed position as seen in FIG. 4, the plurality of elongate rods 158 occupies minimal space and does not receive any substantially flat object 10 between two consecutive elongated rods 158. The plurality of elongated rods 158 could be brought from a deployed position (FIG. 1) to a collapsed position (FIG. 4) by rotating the plurality of elongated rods 158 by 90 degrees in a specific direction and vice versa. FIG. 3 shows the collapsible rack assembly 100 in an intermediate position between the deployed position (FIG. 1) and a collapsed position (FIG. 4). As seen in FIG. 3, the plurality of side racks 152 are rotated inwardly towards the intermediate rack(s) 156. As seen in FIG. 3, the plurality of elongate rods 158 of the intermediate rack(s) 156 has a substantially vertical position. To further bring the collapsible rack assembly 100 from intermediate position (FIG. 3) to collapsed position (FIG. 4), the plurality of side racks 152 are further rotated inwardly and the intermediate rack(s) 156 intermediate rack(s) 156 is rotated by 90 degrees in either direction (clockwise or counter clockwise) such that a plurality of side racks 152, as well as the intermediate rack(s) 156, are substantially coplanar (lies in the same plane) as seen in FIG. 4.

An exemplary method of using the collapsible rack assembly 100 for transport and storage of at least one substantially flat object 10 will be described in reference to FIGS. 1-9.

Initially, the collapsible rack assembly 100 is kept in a collapsed position as shown in FIG. 4. In the collapsed position of collapsible rack assembly 100, the plurality of elongated rods 158 of both side racks 152 as well as the intermediate rack(s) 156 occupies minimal space such that a plurality of side racks 152 as well as the intermediate rack(s) 156 are substantially coplanar (lies in the same plane) as seen in FIG. 4. In the collapsed position of collapsible rack assembly 100, the plurality of elongated rods 158 does not receive any flat object 10 between two consecutive elongated rods 158. In the collapsed position of collapsible rack assembly 100, the manually operable lever 143 is in the unlocked position such that the fastener element 148 is removed from the hole 149 (not shown in figures). In the collapsed position of collapsible rack assembly 100, the screw type fastener 139 of the plurality of clamps 138 is in unlocked position.

Firstly, the plurality of side racks 152 as well as the intermediate rack(s) 156 are rotated by an angle of 90 degrees such that the side racks 152 as well as the intermediate rack(s) 156 lies in different planes wherein planes formed by side racks 152 as well as the plane formed by the intermediate rack(s) 156 are substantially parallel to each other as seen in FIG. 1. Afterwards, the screw type fastener 139 of the clamps 138 are brought into locked position, thereby rotationally locking the side rotational shafts 134 relative to the clamps 138. Each side rack 152 is fixedly connected to a side rotational shaft 134. Thus, the side racks 152 are rotationally locked by bringing the screw type fastener 139 of the p clamps 138 into locked position. Afterwards, the manually operable lever 143 is brought into intermediate position by moving the fastener element 148 in the hole 149 (not shown in figures). Afterwards, at least one substantially flat object 10 is placed in the collapsible rack assembly 100 such that the at least one substantially flat object 10 is positioned between any two consecutive elongated rods 158 of the side racks 152 as well as corresponding two consecutive elongated rods 158 of the intermediate rack(s) 156. In the intermediate position, the manually operable lever 143 enables the sliding motion of intermediate rotational shaft(s) 136 relative to the lever clamp(s) 142. Depending on the thickness of the substantially flat object 10, the intermediate rotational shaft(s) 136 is slided (translated) relative to the lever clamp(s) 142 to effectively hold the substantially flat object(s) 10. Afterwards, the manually operable lever 143 is brought into locked position by rotating the manually operable lever 143 to securely store and transport at least substantially flat object 10, thereby bringing the collapsible rack assembly 100 in deployed position (FIG. 1).

By merely reversing above steps with little to no variation, the collapsible rack assembly 100 could be shifted from deployed position (FIG. 1) to a collapsed position (FIG. 4).

As shown in FIG. 10, the collapsible rack assembly 100 could be removably installed on a working surface 20 i.e., a vehicle 20. The vehicle 20 could have a pre-installed base subassembly 110 such that the new vehicle 20 has a base subassembly 110 integrally formed during manufacturing of vehicle 20. Alternatively, the base subassembly 110 is later installed (custom-fit) in the vehicle 20. Firstly, a plurality of holes (not shown) are drilled in the vehicle 20. Afterwards, the plurality of attachment means 113 of each L track system 112 are aligned with a plurality of holes (not shown) drilled in the vehicle 20. Afterwards, a plurality of screw fasteners (not shown) are fastened to plurality of attachment means 113 as well as the plurality of holes (not shown) drilled in the vehicle 20 to removably connect each L track system 112 of the base subassembly 110 to a vehicle 20, thereby removably connecting the base subassembly 110 to the vehicle 20.

The collapsible rack assembly 100 of the present invention is primarily used for transport and storage of at least one substantially flat object 10 wherein the substantially flat object 10 is a door panel 10. However, it should be obvious to the one skilled in the art that the collapsible rack assembly 100 could be used for transport and storage of other substantially flat object 10 but not limited to: paintings, books, tiles, plates, dishware, wooden panels, vehicle tyres, mirrors, building panels, plates, metal sheets, prefabricated walls, and so on. Broadly speaking, the collapsible rack assembly 100 could be used for transport and storage of any object 10 that could be removably fitted inside the consecutive elongate rods 158 of the side racks 152 as well as corresponding consecutive elongate rods 158 of the intermediate rack(s) 156.

The collapsible rack assembly 100 of the present invention according to FIG. 1-10 is configured such that each clamp 138 comprises a manually operable rotational lock 139 that selectively enables or disables rotation of side rotational shaft 134 relative to clamp 138. A clamp 138 is positioned on the first end 134a of each of the plurality of side rotational shafts 134 and another clamp 138 is positioned on the opposite second end 134b of each of the plurality of side rotational shafts 134.

In another embodiment (not shown in figures), each clamp 138 does not necessarily comprises a manually operable rotational lock 139. At least one clamp 138 comprises a manually operable rotational lock 139 and at least one clamp 138 does not comprises manually operable rotational lock 139. In an embodiment, a clamp 138 comprising a manually operable rotational lock 139 is positioned on only one end of each of the plurality of side rotational shafts 134, and another clamp 138 that does not comprise a manually operable rotational lock 139 is positioned on the other end of each of the plurality of side rotational shafts 134. For instance, in an embodiment, a clamp 138 comprising a manually operable rotational lock 139 is positioned on the first end 134a of each of the plurality of side rotational shafts 134 and another clamp 138 that does not comprise a manually operable rotational lock 139 is positioned on the opposite second end 134b of each of the plurality of side rotational shafts 134. It should be obvious to the one skilled in the art that functionality of the collapsible rack assembly 100 is not substantially changed in this embodiment and overall functionality of the collapsible rack assembly 100 is same.

In another embodiment (not shown in figures), the collapsible rack assembly 100' (not shown in figures) does not include base subassembly 110. Instead, the collapsible rack assembly 100' comprises a rotational shaft subassembly 130 and a rack subassembly 150, similar to collapsible rack assembly 100 of FIG. 1. Each of the plurality of clamps 138 as well as lever clamp(s) 142 of the rotational shaft subassembly 130 of the collapsible rack assembly 100' comprise a plurality of fastener slots 144 to removably connect the plurality of clamps 138 as well as lever clamp(s) 142 directly to the working surface 20 (FIG. 10). A fastener (not shown) passes through the fastener slot 144 and fits inside the pre-drilled holes (not shown in figures) of the working surface 20 to removably connect the plurality of clamps 138 as well as lever clamp(s) 142 directly to the working surface 20.

The collapsible rack assembly 100 of various embodiments of the present invention could be configured in variety of shapes and sizes depending on the requirements of the collapsible rack assembly. Further, the various parts and/or subassemblies of collapsible rack assembly 100 are constructed from materials including but not limited to metals, composites, foams, textiles, plastics, polymers, alloys and so on and manufacturing and/or installation of various parts and/or subassemblies of collapsible rack assembly 100 could utilize conventional technologies already known in the art including but not limited to; welding, drilling, casting, machining and so on. Further, the collapsible rack assembly 100 of FIGS. 1-10 comprises an intermediate rack 156 and a total of two side racks 152. However, it should be obvious to the one skilled in the art that the collapsible rack assembly 100 could have more than one intermediate rack 156 positioned between the two side racks 152.

Although particular embodiments of the invention have been described in detail for purposes of illustration, various modifications and enhancements may be made without departing from the spirit and scope of the invention.

What is claimed is:

1. A collapsible rack assembly (100) for transport and storage, the collapsible rack assembly (100) comprising:
    a rotational shaft subassembly (130) comprising a plurality of side rotational shafts (134), at least one intermediate rotational shaft (136), a plurality of clamps (138), and at least one lever clamp (142),
    wherein each of the plurality of clamps (138) permits rotation of each of the plurality of side rotational shafts (134) relative to the plurality of clamps and
    wherein the at least one lever clamp (142) allows sliding movement and rotational movement of the at least one intermediate rotational shaft (136) relative to the at least one lever clamp (142);
    a plurality of side racks (152), wherein each of the plurality of side racks (152) is fixedly connected to the plurality of side rotational shafts (134); and
    at least one intermediate rack (156), wherein the intermediate rack (156) is fixedly connected to the at least one intermediate rotational shaft (136) and
    wherein each of the plurality of side racks (152) and the intermediate rack (156) comprise a plurality of elongated rods (158) spaced apart from one another to receive at least one substantially flat object (10) between two consecutive elongated rods (158).

2. The collapsible rack assembly (100) of claim 1, wherein the at least one substantially flat object (10) comprises a door panel.

3. The collapsible rack assembly (100) of claim 1, wherein the collapsible rack assembly (100) further comprises a base subassembly (110) which includes a plurality of L track systems (112) connected to at least one spacer (116) to define an overall shape of the base subassembly (110).

4. The collapsible rack assembly (100) of claim 3, wherein the base subassembly (110) is configured to removably connect the collapsible rack assembly (100) to a working surface (20) and allow removable mounting of the plurality of clamps (138) and the at least one lever clamp (142) of the rotational shaft subassembly (130).

5. The collapsible rack assembly (100) of claim 4, wherein each L track system (112) comprises at least one attachment means (113) to connect each L track system (112) to the working surface (20).

6. The collapsible rack assembly (100) of claim 1, wherein the plurality of clamps (138) and the at least one lever clamp (142) comprise a plurality of fastener slots (144) to removably connect the plurality of clamps (138) and the at least one lever clamp (142) to a plurality of L track systems (112).

7. The collapsible rack assembly (100) of claim 1, wherein each of the plurality of clamps (138) comprises a manually operable rotational lock (139) that selectively enables or disables rotation of the plurality of side rotational shafts (134) relative to each clamp (138).

8. The collapsible rack assembly (100) of claim 1, wherein the at least one lever clamp (142) comprises a manually operable lever (143) that selectively enables or disables sliding movement and rotational movement of the at least one intermediate rotational shaft (136) relative to the at least one lever clamp (142).

9. The collapsible rack assembly (100) of claim 1, wherein the at least one intermediate rotational shaft (136) comprises an elongate slot (137) to allow sliding movement of the at least one intermediate rotational shaft (136) relative to the at least one lever clamp (142) by operating a manually operable lever (143).

10. The collapsible rack assembly (100) of claim 1, wherein the plurality of elongated rods (158) comprises at least one contact element (159) positioned thereon.

11. The collapsible rack assembly (100) of claim 1, wherein each of the plurality of side racks (152) comprises a side support platform (153) to provide a resting surface for the at least one substantially flat object (10) between any two consecutive elongated rods (158) of each of the plurality of side racks (152).

12. The collapsible rack assembly (100) of claim 1, wherein the at least one intermediate rack (156) comprises a central support platform (153) to provide a resting surface for the at least one substantially flat object (10) positioned between any two consecutive elongate rods (158) of the intermediate rack (156).

13. The collapsible rack assembly (100) of claim 12, wherein each central support platform (153) comprises a plurality of through holes (154) for enabling passage to the plurality of elongated rods (158) of each intermediate rack (156), wherein each central support platform (153) is connected to a reinforcing plate (155), and wherein the reinforcing plate (155) increases structural rigidity of the at least one intermediate rack (156) and supports weight loads exerted by at least one substantially flat object (10) and the at least one intermediate rack (156).

14. The collapsible rack assembly (100) of claim 1, wherein the plurality of elongated rods (158) is selectively positioned in a deployed position, and a collapsed position, wherein, in the deployed position, the plurality of elongated rods (158) is configured to receive the at least one substantially flat object (10) between two consecutive elongated rods (158).

15. The collapsible rack assembly (100) of claim 14, wherein the plurality of elongated rods (158) is brought from the deployed position to the collapsed position by rotating the plurality of elongated rods (158) by 90 degrees in a specific direction and vice versa.

16. The collapsible rack assembly (100) of claim 14, wherein the collapsible rack assembly (100) is removably installed in a vehicle (20).

17. The collapsible rack assembly (100) of claim 1, wherein each of the plurality of side rotational shafts (134) comprises a first end (134a) and an opposite second end (134b), and wherein one clamp (138) is positioned on the first end (134a) of each of the plurality of side rotational shafts (134) and another clamp (138) is positioned on the opposite second end (134b) of each of the plurality of side rotational shafts (134).

18. The collapsible rack assembly (100) of claim 1, wherein the at least one intermediate rotational shaft (136) comprises a first end (136a) and an opposite second end (136b), wherein the at least one lever clamp (142) is positioned on the first end (136a) of the at least one intermediate rotational shaft (136) and at least one clamp (138) is positioned on the opposite second end (136b) of the at least one intermediate rotational shaft (136), and wherein the at least one lever clamp (142) is positioned between the at least one intermediate rotational shaft (136) and an L track system (112) of a base subassembly (110).

19. The collapsible rack assembly (100) of claim 1, wherein each of the plurality of side racks (152) is identical in nature and comprises an equal number of elongated rods (158), wherein each elongated rod (158) of one side rack (152) lies in the same plane with a corresponding elongated rod (158) of remaining side racks (152).

* * * * *